US012580090B2

(12) United States Patent
Kim et al.

(10) Patent No.: US 12,580,090 B2
(45) Date of Patent: Mar. 17, 2026

(54) BISMUTH HALIDE COMPOUND-PDMS COMPOSITE MATERIAL FOR X-RAY SHIELDING AND MANUFACTURING METHOD THEREOF

(71) Applicant: PUKYONG NATIONAL UNIVERSITY INDUSTRY-UNIVERSITY COOPERATION FOUNDATION, Busan (KR)

(72) Inventors: Junghwan Kim, Busan (KR); Seok Gyu Kang, Gimhae-si (KR); Ha Yeong Kang, Hadong-gun (KR); Dae Seong Kwon, Gimhae-si (KR)

(73) Assignee: PUKYONG NATIONAL UNVERSITY INDUSTRY-UNIVERSITY COOPERATION FOUNDATION, Busan (KR)

(*) Notice: Subject to any disclaimer, the term of this patent is extended or adjusted under 35 U.S.C. 154(b) by 398 days.

(21) Appl. No.: 18/504,148

(22) Filed: Nov. 7, 2023

(65) Prior Publication Data

US 2024/0153658 A1 May 9, 2024

(30) Foreign Application Priority Data

Nov. 9, 2022 (KR) ........................ 10-2022-0148824

(51) Int. Cl.
*G21F 1/00* (2006.01)
*G21F 3/00* (2006.01)

(52) U.S. Cl.
CPC . *G21F 1/00* (2013.01); *G21F 3/00* (2013.01)

(58) Field of Classification Search
CPC .................................... G21F 1/00; G21F 3/00
See application file for complete search history.

(56) References Cited

U.S. PATENT DOCUMENTS

2012/0213994 A1 8/2012 Jafry et al.
2014/0225039 A1* 8/2014 Chiang .................... G21F 1/02 427/430.1

FOREIGN PATENT DOCUMENTS

JP 2021135278 9/2021

OTHER PUBLICATIONS

Nam et al., "Hydrophobic and Hydrophilic PDMS Sponges Prepared Through Physicochemical Treatments" *Trans. Korean Soc. Mech. Eng. A* 2016, 40(8), pp. 737-742 (English Abstract provided).

* cited by examiner

*Primary Examiner* — Sean M Luck
(74) *Attorney, Agent, or Firm* — NORTON ROSE FULBRIGHT US LLP

(57) ABSTRACT

A method for producing a lead-free X-ray shielding material using a bismuth halide compound is provided, the method including a first step of producing porous PDMS (Polydimethylsiloxane); a second step of producing a mixed solution of the bismuth halide compound and THF; and a third step of immersing the porous PDMS into the mixed solution such that the bismuth halide compound is loaded into the porous PDMS to produce a bismuth halide compound-PDMS composite material.

10 Claims, 6 Drawing Sheets

| | BiBr3 20% | BiBr3 40% | BiBr3 60% | BiBr3 80% |
|---|---|---|---|---|
| 1 | 13.54 | 18.4 | 9.94 | 12.56 |
| 2 | 9.39 | 17.72 | 15.94 | 12.15 |
| 3 | 9.14 | 18.25 | 9.58 | 12.92 |
| 4 | 9.67 | 19.02 | 15.16 | 8.62 |
| 5 | 11.62 | 19.08 | 16.26 | 11.68 |
| avg | 10.67 | 18.49 | 13.38 | 11.59 |

| | BiCl3 20% | BiCl3 40% | BiCl3 60% | BiCl3 80% |
|---|---|---|---|---|
| 1 | 14.36 | 21.89 | 22.86 | 16.34 |
| 2 | 16.41 | 21.97 | 23.12 | 15.67 |
| 3 | 16.02 | 20.52 | 23.03 | 18.44 |
| 4 | 16.78 | 20.24 | 22.55 | 21.56 |
| 5 | 14.18 | 22.19 | 22.28 | 21.22 |
| avg | 15.55 | 21.36 | 22.77 | 18.65 |

| | BiF3 20% | BiF3 40% | BiF3 60% | BiF3 80% |
|---|---|---|---|---|
| 1 | 13.87 | 12.17 | 14.35 | 21.34 |
| 2 | 13.32 | 12.22 | 12.33 | 20.58 |
| 3 | 13.05 | 11.52 | 13.43 | 21.91 |
| 4 | 13.81 | 11.80 | 14.21 | 19.50 |
| 5 | 13.22 | 11.42 | 15.34 | 19.07 |
| 6 | 13.45 | 11.83 | 13.93 | 20.48 |

BISMUTH HALIDE COMPOUND-PDMS COMPOSITE MATERIAL FOR X-RAY SHIELDING AND MANUFACTURING METHOD THEREOF

CROSS-REFERENCE TO RELATED APPLICATION

This application claims a benefit under 35 U.S.C. § 119(a) of Korean Patent Application No. 10-2022-0148824 filed on Nov. 9, 2022, with the Korean Intellectual Property Office, the entire disclosure of which is incorporated herein by reference for all purposes.

BACKGROUND

1. Field

The present disclosure relates to a bismuth halide compound-PDMS composite material for shielding X-rays, and more specifically, to a method for producing a lead-free X-ray shielding material using a bismuth halide compound, and the lead-free X-ray shielding material produced using the method.

2. Description of Related Art

Existing lead-based X-ray shielding materials have been most widely used due to their excellent X-ray shielding performance. However, problems such as lead's environmental problems, harmfulness thereof to the human body, poor fit thereof, and heavy weight thereof have been pointed out in many industries. In order to solve these problems, many researchers are conducting researches in the direction of replacing the lead in the development of the X-ray shielding material. However, chronic problems such as dispersion of a material in the shielding material and weight reduction of the shielding material still exist. Therefore, in replacing the existing lead-based shielding material, priority should be given to developing technology that secures lightness and flexibility based on excellent shielding performance.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

A purpose of the present disclosure is to provide a method for producing a lead-free X-ray shielding material using a bismuth halide compound.

Another purpose of the present disclosure is to provide a bismuth halide compound-PDMS composite material for shielding X-rays.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

In one aspect of the present disclosure, a method for producing a lead-free X-ray shielding material using a bismuth halide compound is provided, the method comprising: a first step of producing porous PDMS (Polydimethylsiloxane); a second step of producing a mixed solution of the bismuth halide compound and THF; and a third step of immersing the porous PDMS into the mixed solution such that the bismuth halide compound is loaded into the porous PDMS to produce a bismuth halide compound-PDMS composite material.

The present disclosure relates to the development of an alternative material to replace the lead-based shielding material that has been used conventionally. For this purpose, a material using a Bi (bismuth) halide ($BiI_3$, $BiBr_3$, $BiCl_3$, $BiF_3$) compound and PDMS was developed. In order to further improve the X-ray shielding ability, the bismuth halides are mixed with each other at an appropriate ratio to produce a shielding material that has improved X-ray shielding ability compared to a material using only $BiI_3$. This is because the shielding material is densified due to the complexation of bismuth halides of different sizes, thereby improving the shielding ability. In addition, when the existing bismuth halide salt is simply mixed with PDMS, uniform dispersion thereof is not achieved. However, in accordance with the present disclosure, the porous PDMS is first produced, and then a liquid bismuth halide solution is loaded into the porous PDMS. Thus, the bismuth halide compound-PDMS composite material in which the bismuth halide salts are more uniformly distributed may be implemented. This process technique has the advantage of being able to implement various bismuth halide compound-porous material composite materials using not only PDMS but also various porous materials.

In one implementation of the method, the first step includes: producing a mixed solution by mixing PDMS, a curing agent, and salt (NaCl); mixing the mixed solution using a centrifuge to bring the salt particles into contact with each other within the PDMS; curing the mixed solution; and immersing the curing product into water to remove the NaCl therefrom to produce the porous PDMS.

In one implementation of the method, in the second step, the bismuth halide compound includes: bismuth iodide ($BiI_3$); and one selected from a group consisting of $BiF_3$ (bismuth trifluoride), $BiCl_3$ (bismuth trichloride), and $BiBr_3$ (bismuth tribromide).

In one implementation of the method, in the second step, the mixed solution is produced at a ratio of the bismuth halide compound and THF including $BiI_3$ 0.8 g: $BiBr_3$ 0.2 g: THF 3 ml, $BiI_3$ 0.8 g: $BiCl_3$ 0.2 g: THF 3 ml, or $BiI_3$ 0.6 g: $BiF_3$ 0.4 g: THF 3 ml.

In one implementation of the method, in the third step, the porous PDMS has been immersed in the mixed solution for 15 to 20 hours.

In one implementation of the method, the method further comprises, after the third step, drying the PDMS at 50 to 70° C. for 20 to 60 minutes to remove the THF therefrom such that only the bismuth halide compound is loaded into the PDMS.

Another aspect of the present disclosure provide a bismuth halide compound-PDMS composite material for shielding X-rays, wherein the bismuth halide compound-PDMS composite material is produced by the method as described above, wherein the bismuth halide compound has been loaded into the porous PDMS.

In one implementation of the bismuth halide compound-PDMS composite material, the bismuth halide compound contains $BiI_3$ and $BiBr_3$, wherein when a tube voltage is 60 kV, a shielding ratio of the bismuth halide compound-PDMS composite material is 75% or greater.

In one implementation of the bismuth halide compound-PDMS composite material, the bismuth halide compound contains $BiI_3$ and $BiCl_3$, wherein when a tube voltage is 60 kV, a shielding ratio of the bismuth halide compound-PDMS composite material is 64.5% or greater.

In one implementation of the bismuth halide compound-PDMS composite material, the bismuth halide compound contains $BiI_3$ and $BiF_3$, wherein when a tube voltage is 60 kV, a shielding ratio of the bismuth halide compound-PDMS composite material is 73% or greater.

The method of the present disclosure may produce a lead-free, lightweight, flexible radiation shielding material. In the future, harm thereof to the human body and the environment may be minimized via sealing thereof with a separate encapsulant. A lightweight radiation shielding fibers may be produced via adsorption thereof onto fibers.

Furthermore, the radiation shielding fiber may be used to produce a lightweight radiation shielding clothing, which may significantly improve the lightweight and usability of shielding material clothing or equipment in the medical field. The shielding material market may be broadly expanded to high value-added industries such as electronic devices and high-tech precision industries as well as the aerospace industry, medical industry, and military. The shielding material may be utilized to meet the needs of a wider range of other industries.

In addition to the effects as described above, specific effects in accordance with the present disclosure will be described together with the detailed description for carrying out the disclosure.

DETAILED DESCRIPTION OF THE INVENTION

Figure 1:
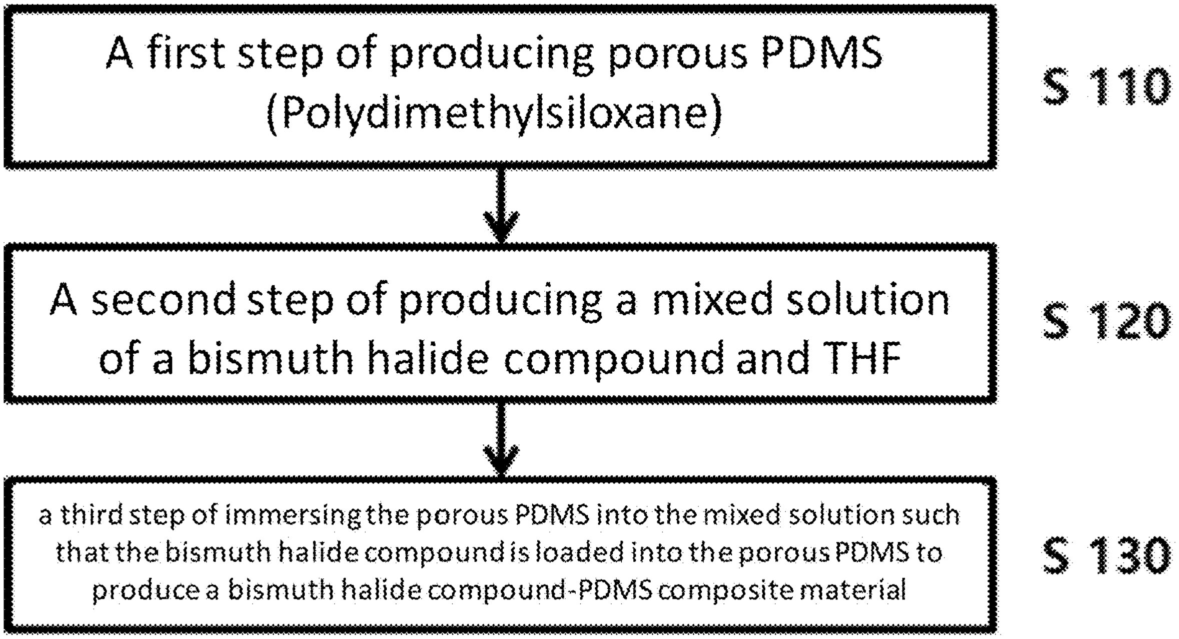
FIG. 1 is a flowchart showing a producing method of the present disclosure.

For simplicity and clarity of illustration, elements in the figures are not necessarily drawn to scale. The same reference numbers in different figures represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for illustrating embodiments of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when a certain embodiment may be implemented differently, a function or operation specified in a specific block may occur in a sequence different from that specified in a flowchart. For example, two consecutive blocks may actually be executed at the same time. Depending on a related function or operation, the blocks may be executed in a reverse sequence.

In descriptions of temporal relationships, for example, temporal precedent relationships between two events such as "after", "subsequent to", "before", etc., another event may occur therebetween unless "directly after", "directly subsequent" or "directly before" is not indicated.

The features of the various embodiments of the present disclosure may be partially or entirely combined with each other, and may be technically associated with each other or operate with each other. The embodiments may be implemented independently of each other and may be implemented together in an association relationship.

For an example, porous PDMS is immersed in a bismuth halide compound solution to produce a bismuth halide compound-PDMS composite material. Then, the shielding performance of the bismuth halide compound-PDMS composite material is identified based on a comparing result thereof with that of a composite material using only $BiI_3$.

Example: Method for Producing Bismuth Halide Compound-PDMS Composite Material

Figure 2:
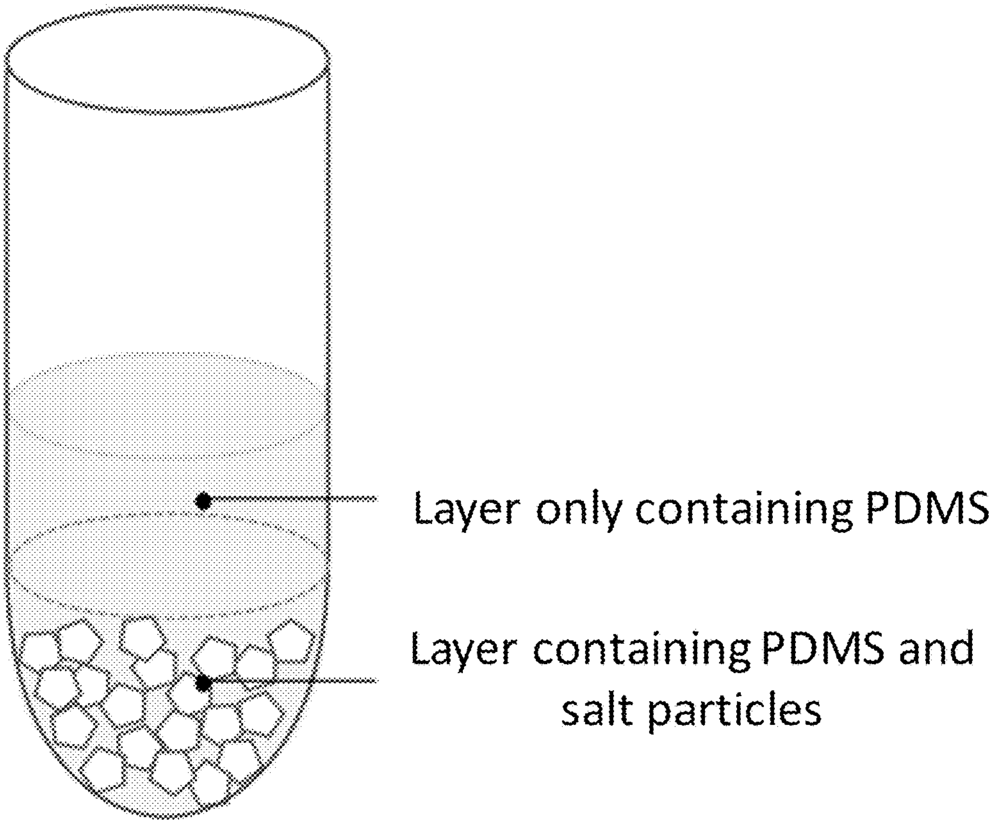
FIG. 2 is a schematic diagram of a process of producing porous PDMS.
Figure 3:
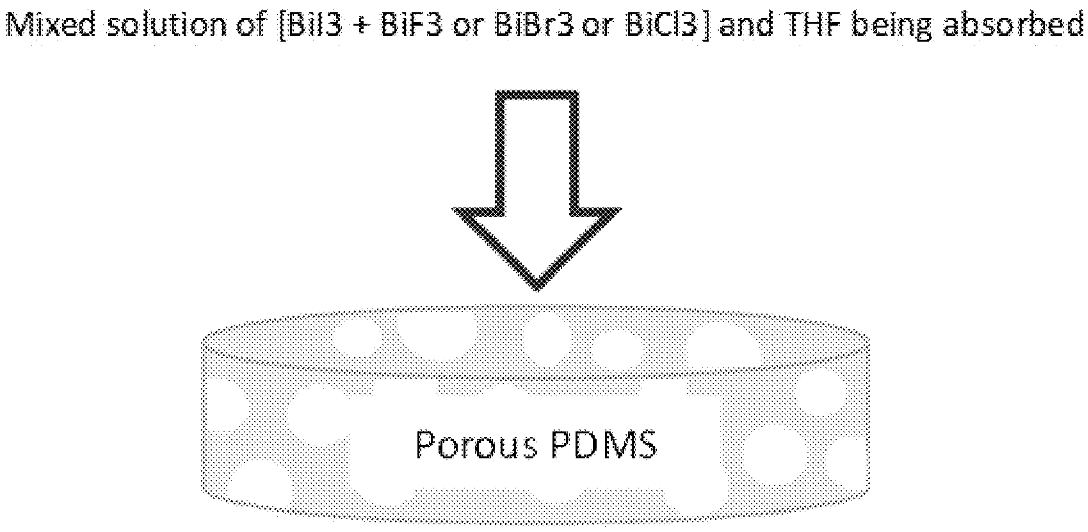
FIG. 3 is a schematic diagram of a process of producing a bismuth halide compound-PDMS composite material.
Figure 4:
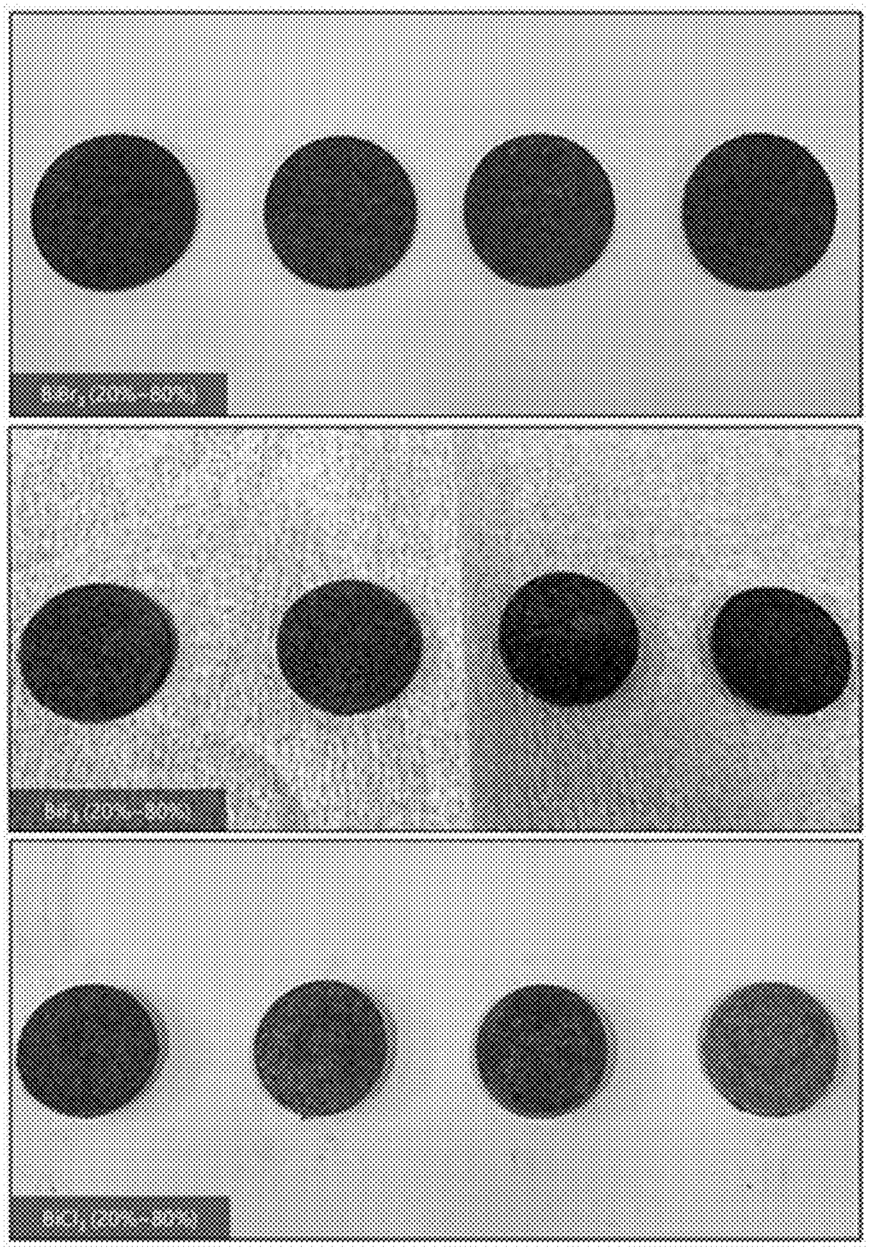
FIG. 4 is a photo of a bismuth halide compound-PDMS composite material sample based on a content of each of $BiI_3$, $BiBr_3$, and $BiCl_3$ (20%, 40%, 60%, 80%).

FIG. 1 is a flow chart showing the producing method of the present disclosure, FIG. 2 is a schematic diagram of the process of producing porous PDMS, FIG. 3 is a schematic diagram of the process of producing the bismuth halide compound-PDMS composite material, and FIG. 4 is a photo of a bismuth halide compound-PDMS composite material sample based on a content of each of $BiI_3$, $BiBr_3$, and $BiCl_3$ (20%, 40%, 60%, 80%).

Referring to FIG. 1, FIG. 2, FIG. 3, and FIG. 4, PDMS (Polydimethylsiloxane), a curing agent, and salt (NaCl) were mixed with each other to produce a mixed solution. At this time, a ratio of PDMS:curing agent:salt was 10:1:15 (mass ratio).

Afterwards, the mixed solution was subjected to mixing at 8,000 rpm using a centrifuge for 20 minutes. This process was repeated three times, and then excess PDMS was removed therefrom to allow the salt particles to contact each other within the PDMS.

After the reaction was completed, the PDMS was heat-treated at 60° C. for 18 hours and a cured PDMS was cut into a coin shape with a diameter of 25 mm and a thickness of 3 mm.

The coin-shaped PDMS was immersed in water at 60° C. for 18 hours to remove the water-soluble salt particles therefrom to produce the porous PDMS.

Then, the bismuth halide compound of $BiI_3$ and one of $BiBr_3$, $BiCl_3$ and $BiF_3$ was mixed with a THF solution ($BiI_3$ 0.8 g: $BiBr_3$ 0.2 g: THF 3 ml, $BiI_3$ 0.8 g: $BiCl_3$ 0.2 g: THF 3 ml or $BiI_3$ 0.6 g: $BiF_3$ 0.4 g: THF 3 ml) to produce a mixed solution which was a bismuth halide compound solution as an adsorption target. At this time, each of $BiBr_3$, $BiCl_3$, and $BiF_3$ was contained at weight ratios of 20%, 40%, 60%, and 80%.

Finally, the porous PDMS was immersed in the bismuth halide compound solution as the mixed solution as the adsorption target for 18 hours such that the bismuth halide compound was loaded into the porous PDMS. To remove THF therefrom, the PDMS was dried at 60° C. for 30 minutes.

In a reference example, porous PDMS having only $BiI_3$ loaded therein was prepared using the same method.

Figure 5:
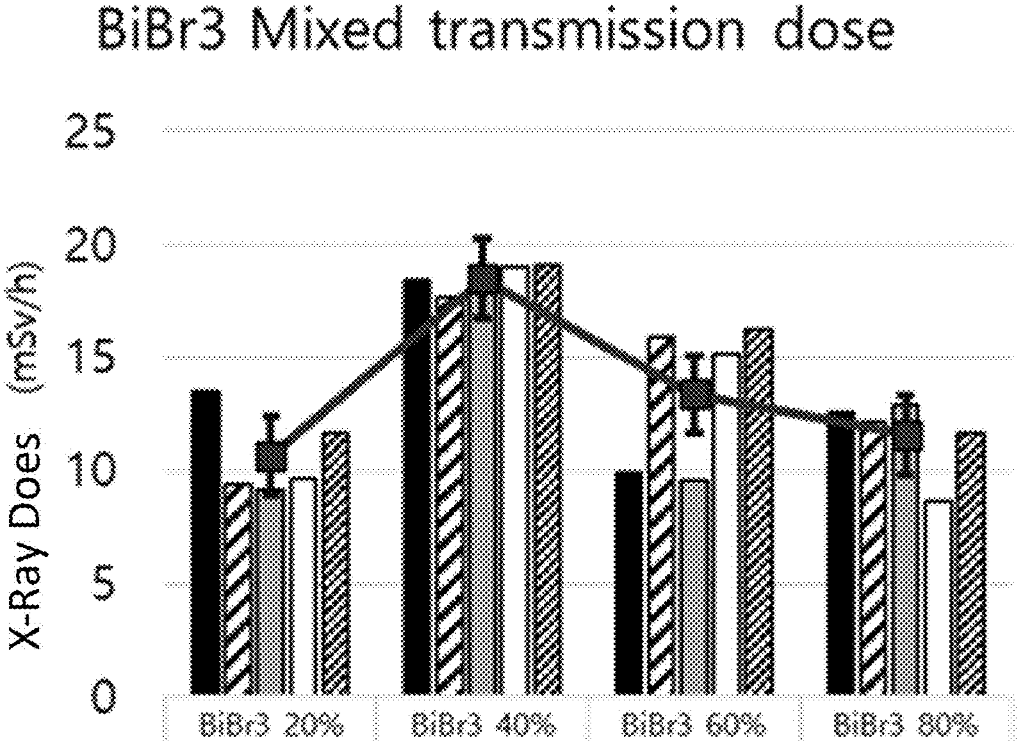
FIG. 5 is an experimental graph of a shielding ability of [$BiI_3$+$BiBr_3$]-PDMS based on a $BiBr_3$ content at a tube voltage of 60 kV.
Figure 6:
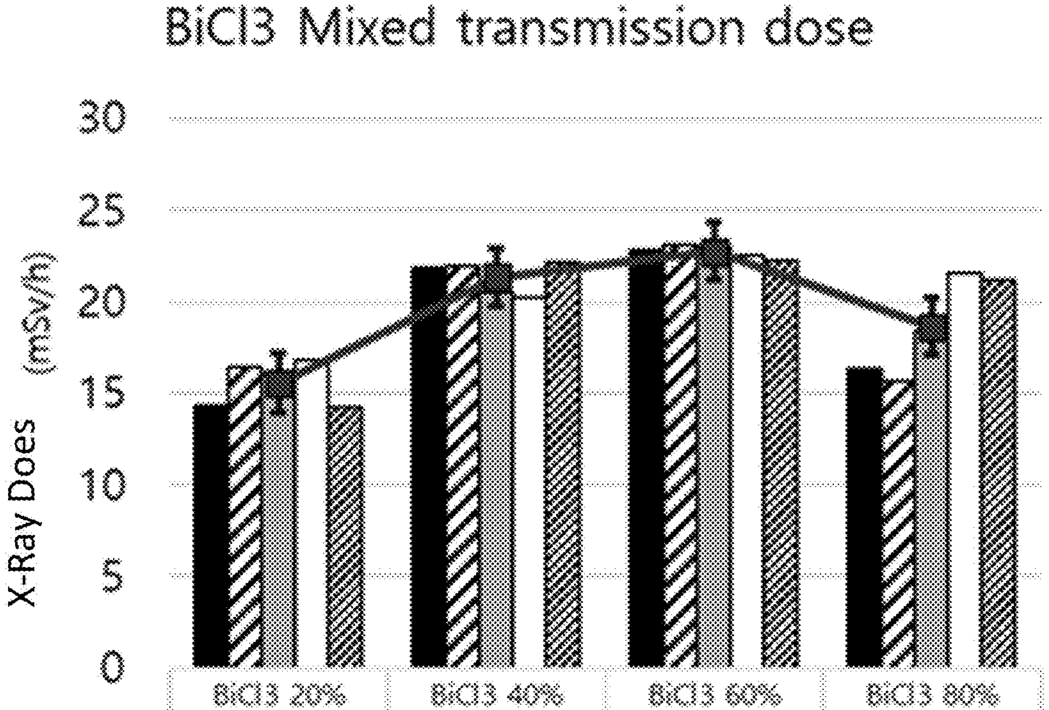
FIG. 6 is an experimental graph of a shielding ability of [$BiI_3$+$BiCl_3$]-PDMS based on a $BiCl_3$ content at a tube voltage of 60 kV.
Figure 7:
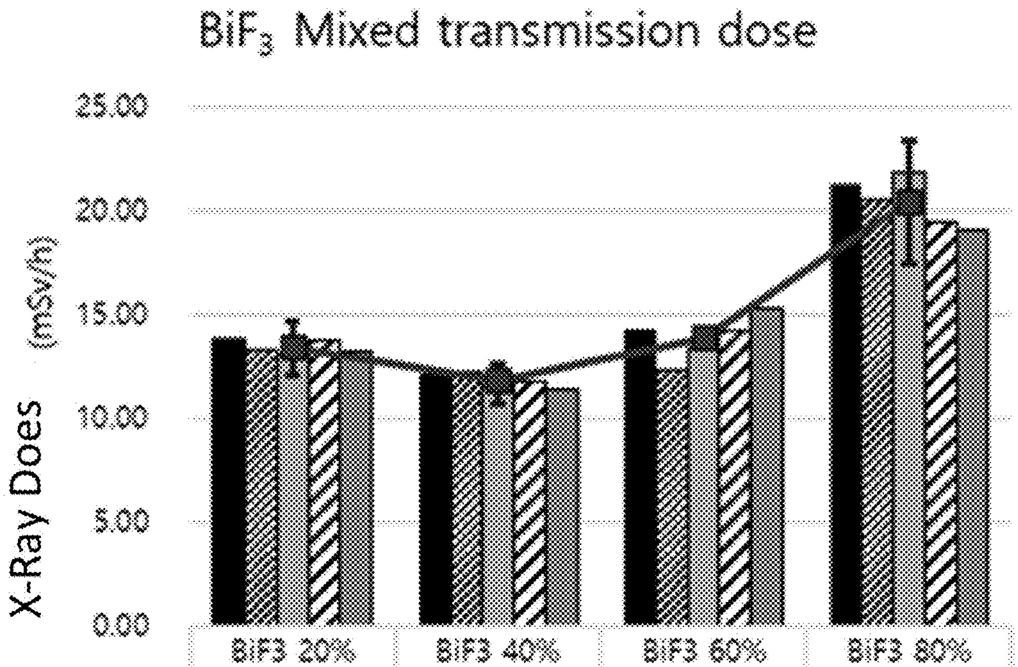
FIG. 7 is an experimental graph of a shielding ability of [$BiI_3$+$BiF_3$]-PDMS according to a $BiF_3$ content at a tube voltage of 60 kV.

Experimental Example: Shielding Ability Experiment of Bismuth Halide Compound-PDMS Composite Material Based on Type of Bismuth Halide Compound FIG. 5 is an experimental graph of the shielding ability of $[BiI_3+BiBr_3]$-PDMS based on a $BiBr_3$ content at a tube voltage of 60 kV. FIG. 6 is an experimental graph of the shielding ability of $[BiI_3+BiCl_3]$-PDMS based on a $BiCl_3$ content at a tube voltage of 60 kV. FIG. 7 is an experimental graph of the shielding ability of $[BiI_3+BiF_3]$-PDMS based on a $BiF_3$ content at a tube voltage of 60 kV.

Referring to FIG. 5, FIG. 6, and FIG. 7, it was identified that the shielding ability of [$BiI_3$ and one of $BiBr_3$, $BiCl_3$, and $BiF_3$]-PDMS composite material was better than that of a $BiI_3$ alone-PDMS composite material.

First, a 3 mm thick specimen was irradiated with X-ray at 60 kV tube voltage. In this case, the $BiI_3$-based $BiBr_3$-PDMS composite material had the lowest shielding ratio of 58.2% when the $BiBr_3$ weight ratio was 40% and had the highest shielding ratio of 75.88% when the $BiBr_3$ weight ratio was 20%.

Next, the $BiI_3$-based $BiCl_3$-PDMS composite material had the lowest shielding ratio of 51.71% when the $BiCl_3$ weight ratio was 40% and had the highest shielding ratio of 64.85% when the $BiCl_3$ weight ratio was 20%.

Subsequently, the $BiI_3$-based $BiF_3$-PDMS composite material had the lowest shielding ratio of 53.81% when the $BiF_3$ weight ratio was 80% and had the highest shielding ratio of 73.27% when the $BiF_3$ weight ratio was 40%.

Each of $BiBr_3$, $BiCl_3$, and $BiF_3$ plays an auxiliary role in filling an empty space between dispersed $BiI_3$ more densely, resulting in a synergy effect that can enhance performance. It was identified that under the same condition, the shielding ratio of using the material using only $BiI_3$ was measured to be 61.72% to 69.27%, while the shielding ability was improved up to 75% by using the compound of the bismuth halides without a repeated loading process.

TABLE 1

| Content ($BiI_3$-Based) | 1 | 2 | 3 | 4 | 5 | avg | +error | −error | Shielding ability |
|---|---|---|---|---|---|---|---|---|---|
| $BiBr_3$ 20% | 13.54 | 9.39 | 9.14 | 9.67 | 11.62 | 10.67 | 1.92 | 2.48 | 75.88% |
| $BiBr_3$ 40% | 18.40 | 17.72 | 18.25 | 19.02 | 19.08 | 18.49 | 0.00 | 1.36 | 58.20% |
| $BiBr_3$ 60% | 9.94 | 15.94 | 9.58 | 15.16 | 16.26 | 13.38 | 0.00 | 6.68 | 69.76% |
| $BiBr_3$ 80% | 12.56 | 12.15 | 12.92 | 8.62 | 11.68 | 11.59 | 1.24 | 3.06 | 73.81% |

TABLE 2

| Content ($BiI_3$-Based) | 1 | 2 | 3 | 4 | 5 | avg | +error | −error | Shielding ability |
|---|---|---|---|---|---|---|---|---|---|
| $BiCl_3$ 20% | 14.36 | 16.41 | 16.02 | 16.78 | 14.18 | 15.55 | 2.60 | 0.00 | 64.85% |
| $BiCl_3$ 40% | 21.89 | 21.97 | 20.52 | 20.24 | 22.19 | 21.36 | 0.00 | 1.94 | 51.71% |

TABLE 2-continued

| Content ($BiI_3$-Based) | 1 | 2 | 3 | 4 | 5 | avg | +error | −error | Shielding ability |
|---|---|---|---|---|---|---|---|---|---|
| $BiCl_3$ 60% | 22.86 | 23.12 | 23.03 | 22.55 | 22.28 | 22.77 | 0.84 | 0.00 | 48.54% |
| $BiCl_3$ 80% | 16.34 | 15.67 | 18.44 | 21.56 | 21.22 | 18.65 | 0.34 | 5.55 | 57.85% |

TABLE 3

| Content ($BiI_3$-Based) | 1 | 2 | 3 | 4 | 5 | avg | +error | −error | Shielding ability |
|---|---|---|---|---|---|---|---|---|---|
| $BiF_3$ 20% | 13.87 | 13.32 | 13.05 | 13.81 | 13.22 | 13.45 | 0.65 | 0.16 | 69.59% |
| $BiF_3$ 40% | 12.17 | 12.22 | 11.52 | 11.80 | 11.42 | 11.83 | 0.80 | 0.00 | 73.27% |
| $BiF_3$ 60% | 14.35 | 12.33 | 13.43 | 14.21 | 15.34 | 13.93 | 0.00 | 3.00 | 68.51% |
| $BiF_3$ 80% | 21.34 | 20.58 | 21.91 | 19.50 | 19.07 | 20.48 | 2.84 | 0.00 | 53.71% |

A description of the presented embodiments is provided so that a person skilled in the art of any of the present disclosure may use or practice the present disclosure. Various modifications to these embodiments will be apparent to those skilled in the art of the present disclosure. The general principles defined herein may be applied to other embodiments without departing from the scope of the present disclosure. Thus, the present disclosure should not be limited to the embodiments as presented herein, but should be interpreted in the widest scope consistent with the principles and novel features as presented herein.

What is claimed is:

1. A method for producing a lead-free X-ray shielding material using a bismuth halide compound, the method comprising:

a first step of producing porous PDMS (Polydimethylsiloxane);

a second step of producing a mixed solution of the bismuth halide compound and THF; and a third step of immersing the porous PDMS into the mixed solution such that the bismuth halide compound is loaded into the porous PDMS to produce a bismuth halide compound-PDMS composite material.

2. The method of claim 1, wherein the first step includes:

producing a mixed solution by mixing PDMS, a curing agent, and salt (NaCl);

mixing the mixed solution using a centrifuge to bring the salt particles into contact with each other within the PDMS;

curing the mixed solution; and immersing the curing product into water to remove the NaCl therefrom to produce the porous PDMS.

3. The method of claim 1, wherein in the second step, the bismuth halide compound includes:

bismuth iodide ($BiI_3$); and one selected from a group consisting of $BiF_3$ (bismuth trifluoride), $BiCl_3$ (bismuth trichloride), and $BiBr_3$ (bismuth tribromide).

4. The method of claim 3, wherein in the second step, the mixed solution is produced at a ratio of the bismuth halide compound and THF including $BiI_3$ 0.8 g: $BiBr_3$ 0.2 g: THF 3 ml, $BiI_3$ 0.8 g: $BiCl_3$ 0.2 g: THF 3 ml, or $BiI_3$ 0.6 g: $BiF_3$ 0.4 g: THF 3 ml.

5. The method of claim 1, wherein in the third step, the porous PDMS has been immersed in the mixed solution for 15 to 20 hours.

6. The method of claim 1, wherein the method further comprises, after the third step, drying the PDMS at 50 to 70° C. for 20 to 60 minutes to remove the THF therefrom such that only the bismuth halide compound is loaded into the PDMS.

7. A bismuth halide compound-PDMS composite material for shielding X-rays, wherein the bismuth halide compound-PDMS composite material is produced by the method of claim 1, wherein the bismuth halide compound has been loaded into the porous PDMS.

8. The bismuth halide compound-PDMS composite material of claim 7, wherein the bismuth halide compound-PDMS composite material contains $BiI_3$ at a content of 80% by weight and $BiBr_3$ at a content of 20% by weight based on a total weight of the bismuth halide compound, wherein when a tube voltage is 60 kV, a shielding ratio of the bismuth halide compound-PDMS composite material is 75% or greater.

9. The bismuth halide compound-PDMS composite material of claim 7, wherein the bismuth halide compound contains $BiI_3$ at a content of 80% and $BiCl_3$ at a content of 20% by weight based on a total weight of the bismuth halide compound, wherein when a tube voltage is 60 kV, a shielding ratio of the bismuth halide compound-PDMS composite material is 64.5% or greater.

10. The bismuth halide compound-PDMS composite material of claim 7, wherein the bismuth halide compound contains $BiI_3$ at a content of 60% and $BiF_3$ at a content of 40% by weight based on a total weight of the bismuth halide compound, wherein when a tube voltage is 60 kV, a shielding ratio of the bismuth halide compound-PDMS composite material is 73% or greater.

* * * * *